United States Patent
Richter et al.

(10) Patent No.: US 11,904,514 B2
(45) Date of Patent: Feb. 20, 2024

(54) FOAMING PROCESS FOR PRODUCTION OF FOAM MATERIALS

(71) Applicant: Evonik Operations GmbH, Essen (DE)

(72) Inventors: Thomas Richter, Darmstadt (DE);
Andreas Liebe, Darmstadt (DE);
Christian Traßl, Warmensteinach (DE);
Florian Becker, Darmstadt (DE);
Vincent Ma Junyong, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 245 days.

(21) Appl. No.: 17/310,059

(22) PCT Filed: Dec. 19, 2019

(86) PCT No.: PCT/EP2019/086250
§ 371 (c)(1),
(2) Date: Jul. 14, 2021

(87) PCT Pub. No.: WO2020/148067
PCT Pub. Date: Jul. 23, 2020

(65) Prior Publication Data
US 2022/0063153 A1   Mar. 3, 2022

(30) Foreign Application Priority Data
Jan. 16, 2019 (EP) .................................. 19152178

(51) Int. Cl.
| | | |
|---|---|---|
| *B29C 44/02* | (2006.01) | |
| *C08J 3/28* | (2006.01) | |
| *B29C 44/34* | (2006.01) | |
| *B29C 35/08* | (2006.01) | |
| *B29K 105/04* | (2006.01) | |

(52) U.S. Cl.
CPC ...... *B29C 44/3415* (2013.01); *B29C 35/0805* (2013.01); *B29C 2035/0855* (2013.01); *B29K 2105/04* (2013.01)

(58) Field of Classification Search
CPC ............ B29C 2035/0855; B29C 44/02; B29C 44/3415; B29K 2105/04; C08J 3/28
USPC ....... 264/51, 53, 54, 415, 417, 420; 521/915
See application file for complete search history.

(56) References Cited

U.S. PATENT DOCUMENTS

| | | |
|---|---|---|
| 3,627,711 A | 12/1971 | Schroeder et al. |
| 4,139,685 A | 2/1979 | Schroeder |
| 4,334,971 A | 6/1982 | Mahnke et al. |
| 4,578,231 A | 3/1986 | Molteni |
| 4,740,530 A | 4/1988 | Pip |
| 4,996,109 A | 2/1991 | Krieg et al. |
| 5,064,667 A | 11/1991 | Barringer et al. |
| 8,080,592 B2 | 12/2011 | Kruper, Jr. et al. |
| 10,207,435 B2 | 2/2019 | Bernhard et al. |
| 10,343,314 B2 | 7/2019 | Bernhard et al. |
| 10,584,225 B2 | 3/2020 | Richter et al. |
| 10,597,531 B2 | 3/2020 | Prissok et al. |
| 10,619,024 B2 | 4/2020 | Richter et al. |
| 10,954,319 B2 | 3/2021 | Richter et al. |
| 2002/0117769 A1 | 8/2002 | Arch et al. |
| 2004/0235973 A1* | 11/2004 | Stein ................... B29C 44/3415 264/53 X |
| 2006/0210785 A1* | 9/2006 | Takada ............... B01D 67/0023 264/51 X |
| 2014/0051777 A1 | 2/2014 | Zorn et al. |
| 2015/0014607 A1 | 1/2015 | Kaneko et al. |
| 2015/0352759 A1 | 12/2015 | Van Luck |
| 2016/0039986 A1 | 2/2016 | Zimmermann et al. |
| 2016/0332344 A1 | 11/2016 | Bernhard et al. |
| 2017/0087750 A1 | 3/2017 | Bernhard et al. |
| 2017/0136665 A1 | 5/2017 | Bernhard et al. |
| 2019/0153186 A1 | 5/2019 | Richter et al. |
| 2019/0211124 A1 | 7/2019 | Richter et al. |
| 2022/0126490 A1 | 4/2022 | Richter et al. |

FOREIGN PATENT DOCUMENTS

| | | |
|---|---|---|
| CN | 1483059 | 3/2004 |
| CN | 1281401 C | 10/2006 |
| CN | 105073371 | 11/2015 |
| CN | 205167373 U | 4/2016 |
| CN | 104602802 | 5/2016 |
| CN | 106459465 | 2/2017 |
| CN | 107698976 | 2/2018 |
| DE | 1817156 | 7/1970 |
| DE | 2726259 | 11/1985 |
| DE | 10 2013 223 347 | 5/2015 |
| EA | 030878 | 10/2018 |
| EP | 0 048 119 A2 | 3/1982 |
| EP | 0 048 119 A3 | 3/1982 |
| EP | 0 037 470 | 6/1985 |
| EP | 0 259 706 A2 | 3/1988 |

(Continued)

OTHER PUBLICATIONS

Goldmann et al., U.S. Appl. No. 18/250,824, filed Apr. 27, 2023.
U.S. Appl. No. 18/250,824, filed Apr. 27, 2023, Goldmann et al.
Traßl et al., U.S. Appl. No. 18/063,075, filed Dec. 7, 2022.
Traßl et al., U.S. Appl. No. 18/003,666, filed Dec. 28, 2022.
Wursche et al., U.S. Appl. No. 17/995,030, filed Sep. 29, 2022.
U.S. Appl. No. 17/995,030, filed Sep. 29, 2022, Wursche et al.
U.S. Appl. No. 18/063,075, filed Dec. 7, 2022, Traßl et al.
U.S. Appl. No. 18/003,666, filed Dec. 28, 2022, Traßl et al.
U.S. Appl. No. 18/041,771, filed Feb. 15, 2023, Trassl et al.
International Search Report dated Jan. 17, 2020 in PCT/EP2019/086250, 3 pages.
Written Opinion dated Jan. 17, 2020 in PCT/EP2019/086250, 4 pages.

(Continued)

*Primary Examiner* — Leo B Tentoni
(74) *Attorney, Agent, or Firm* — Grüneberg and Myers PLLC

(57) ABSTRACT

A production process can produce foam materials from polymer compositions. This process involves preheating in the foaming of polymers containing blowing agents and subsequent foaming by a thermal process assisted by microwaves.

13 Claims, No Drawings

(56) References Cited

FOREIGN PATENT DOCUMENTS

| | | |
|---|---|---|
| EP | 0 259 706 A3 | 3/1988 |
| EP | 0 356 714 | 3/1992 |
| EP | 2 441 794 A2 | 4/2012 |
| EP | 2 441 794 A3 | 4/2012 |
| EP | 3 075 769 | 10/2016 |
| EP | 3 075 770 | 10/2016 |
| EP | 3277748 | 10/2016 |
| JP | 59-184630 | 10/1984 |
| JP | 60-262835 | 12/1985 |
| JP | 63-074629 | 4/1988 |
| KR | 2003-0059827 | 7/2003 |
| RU | 2482139 | 5/2013 |
| RU | 2015147264 | 5/2017 |
| WO | 03/037598 A2 | 5/2003 |
| WO | 03/037598 A3 | 5/2003 |
| WO | 2013/146925 | 10/2013 |
| WO | 2015/071239 | 5/2015 |
| WO | 2016/146395 | 9/2016 |
| WO | 2016/156172 | 10/2016 |
| WO | 2018/046380 | 3/2018 |
| WO | 2018/095760 | 5/2018 |
| WO | 2020/148066 | 7/2020 |
| WO | 2020/148067 | 7/2020 |
| WO | 2021/023432 | 2/2021 |
| WO | 2022/037857 | 2/2022 |

OTHER PUBLICATIONS

U.S. Appl. No. 15/312,324, filed Nov. 18, 2016, 2017/0087750, Bernhard et al.
U.S. Pat. No. 10,343,314, Jul. 9, 2019, 2016/0332344, Berhard et al.
U.S. Pat. No. 10,207,435, Feb. 19, 2019, 2017/0136665, Bernhard et al.
U.S. Pat. No. 10,619,024, Apr. 14, 2020, 2019/0153186, Richter et al.
International Search Report dated Jan. 17, 2020, in PCT/EP2019/086245, 5 pages.
Lin Tao, Common Knowledge Evidence 1: "Cross-Century High-Efficiency High-Tech", Popular Science Press, Dec. 1993, with partial English translation, p. 218.
U.S. Office Action dated Jul. 7, 2023, in U.S. Appl. No. 17/423,152, 7 pages.
Written Opinion dated Jan. 17, 2020, in PCT/EP2019/086245, 5 pages.
Traβl et al., U.S. Appl. No. 18/255,409, filed Jun. 1, 2023.
Chinese Office Action dated Jul. 19, 2023, in Chinese Application No. 201980088967.0, with English translation, 19 pages.
Zhang et al., "Polyimide Foam Materials", Beijing: National Defense Industry Press, Nov. 2018, p. 134.
Zhou et al., "Polymer Material Forming Processing", Beijing: China Light Industry Press, May 2000, pp. 364-365.
U.S. Appl. No. 17/423,152, filed Jul. 15, 2021, 2022/0126490, Richter et al.
U.S. Appl. No. 18/255,409, filed Jun. 1, 2023, Traβl, et al.

* cited by examiner

FOAMING PROCESS FOR PRODUCTION OF FOAM MATERIALS

CROSS-REFERENCE TO RELATED APPLICATIONS

This application is the National Stage entry under § 371 of International Application No. PCT/EP2019/086250, filed on Dec. 19, 2019, and which claims the benefit of European Application No. 19152178.0, filed on Jan. 16, 2019. The content of each of these applications is hereby incorporated by reference in its entirety.

BACKGROUND OF THE INVENTION

Field of the Invention

The present invention relates to a novel production process for foam materials from polymer compositions, wherein this novel process comprises a process step of preheating in the foaming of polymers containing blowing agents and subsequent foaming by a thermal process assisted by microwaves.

Description of Related Art

Foaming processes for polymers for producing (rigid) foams are common knowledge. Known processes include continuous extrusion processes in which polymers are melted in an extruder and loaded with blowing agents, in which case they foam as a result of the pressure drop on exit from the nozzle, bead foam processes in which blowing agent-containing polymer pellets are foamed in a mould by supplying energy (thermally, steam), batch processes in which polymers are loaded under pressure with $CO_2$ or $N_2$, for example, under supercritical conditions and foam in the event of a pressure drop, or else slabstock foam processes in which polymers containing blowing agents are softened by heating above the glass transition temperature in an oven and foam by virtue of the blowing agent present.

The abovementioned slabstock foam processes in which a polymer sheet containing blowing agents is thermally heated above the Tg of the polymer are used inter alia for the production of PMI- or PMMA-based rigid foams (DE2726259, DE1817156, EP3277748). One reason for the use is the good adjustability of the density of the foams obtained via the foaming temperature/foaming duration. Furthermore, the abovementioned rigid foams based on PMI or PMMA are not obtainable economically by other production processes since their high molecular weights, important for mechanical properties, mean that they are not producible by extrusion processes.

Microwave technologies find only very limited use in the production of foams. EP 0037470 describes, for example, the production of elastic melamine foams. This involves heating, and hence foaming and crosslinking, a liquid melamine-formaldehyde precondensate with the aid of microwave radiation.

EP 3277748 gives a superficial description that it is possible to foam blowing agent-containing PMMA cast polymers even with a combination of thermally supplied energy in conjunction with microwaves. But no more exact details are given as to the process parameters or the upstream preheating step.

The rigid foam blocks are preferably produced from polymer sheets obtained by a casting polymerization process in which blowing agent is added to the monomer solution before polymerization. In order to foam these blowing agent-containing polymer sheets, they must be heated above the boiling point/decomposition point of the blowing agents present and simultaneously above the glass transition temperature of the polymer. Purely thermal heating in an oven has the disadvantage that the energy input into the polymer takes place purely by convection and conduction of thermal energy. This process may take two to three hours since plastics are poor thermal conductors per se and the foam temperature in the core of the polymer sheets is thus achieved only slowly. Furthermore, the foaming polymer insulates itself with respect to the oven temperature.

Problem

The problem addressed was that of developing an economically viable process for foaming (rigid) foams that simultaneously leads to a product having very homogeneous pore structure. Particularly for the production of rigid foam blocks, such as PMI- and PMMA-based foams that cannot be produced by extrusion processes, for example, on account of their high molar masses of the matrix polymer, an economically viable foaming process was to be developed. A further aim was to distinctly shorten the process for production of rigid foam sheets and hence to make the foaming process more economically viable.

Further problems not discussed explicitly at this point may be apparent hereinafter from the related art, the description, the embodiments, or working examples.

SUMMARY OF THE INVENTION

Solution

The objects are achieved by a novel process for producing foams, characterized in that, in this process, polymer compositions containing a blowing agent are foamed in an apparatus, and in that the polymer compositions to be foamed are preheated prior to the foaming. Said apparatus has a thermal heating device for heating to an internal temperature of the apparatus $T_S$ and at least one microwave source by means of which the polymer compositions are irradiated simultaneously.

DETAILED DESCRIPTION OF THE INVENTION

The polymer composition is preferably a material that forms a rigid foam after foaming. This is more preferably P(M)I (poly(meth)acrylamide), PMMA, a methacrylate-based copolymer, PVC (polyvinyl chloride), PP (polypropylene), PU (a polyurethane), especially highly crosslinked PU, a polysulfone or a poly(ether)imide.

In the preheating step, the polymers to be foamed, prior to the foaming conducted in the apparatus, are preheated at a temperature $T_V$ between a minimum of 80° C. below and a maximum of 10° C. above the internal temperature of the apparatus $T_S$. Preferably, $T_V$ is at a minimum of 60° C., more preferably a minimum of 40° C., especially a minimum of 20° C., below the internal temperature of the apparatus. Also preferably, $T_V$ is not higher than $T_S$, and is more preferably at least 10° C. lower than $T_S$.

The preheating and the actual foaming can be effected in the same apparatus, for example in the form of an optional temperature change and a switch-on of the microwave sources after the preheating. However, preference is given to conducting the two steps in separate apparatuses. For instance, the preheating can be effected simultaneously in a large oven with multiple workpieces. Individual workpieces are then taken therefrom for the foaming.

It has been found to be particularly advantageous to conduct the preheating in such a way that the temperature differential thereafter between the coldest and hottest point within the polymer compositions after preheating is not greater than 15° C., preferably not greater than 10° C. Equally preferably, the preheated polymer composition is then sent directly to the foaming in the apparatus.

It is especially advantageous to preheat the polymer composition, prior to the foaming, to a preheating temperature $T_V$ above the glass transition temperature $T_g$ of the polymer composition. Ideally, the polymer composition is elastic when the actual foaming is commenced.

For many materials, even those with a relatively high crystalline component, for example PP, in a simplified manner, a preheating temperature $T_V$ between 110 and 190° C. has been found to be favourable. In general, the preheating time is at least 60 min, preferably at least 100 min.

Preference is given to using microwave radiation having a frequency between 0.85 and 6.0 GHz. It has been found to be favourable to use polymer sheets having a thickness between 10 and 30 mm, preferably between 20 and 25 mm, as polymer composition.

The actual foaming can be effected, for example, within 2 to 30 min, preferably within 5 to 20 min, in the apparatus.

In a preferred embodiment of the present invention, the polymer composition is PMI. For this embodiment, the preheating temperature $T_V$ is preferably between 120 and 190° C. and the internal temperature of the apparatus $T_S$ between 180 and 240° C.

In another preferred embodiment of the present invention, the polymer composition is PMMA or a methacrylate-based copolymer. For this embodiment, the preheating temperature $T_V$ is preferably between 110 and 140° C. and the internal temperature of the apparatus $T_S$ between 120 and 190° C.

A major advantage of the process according to the invention is that it can be conducted in an environmentally benign manner and in very short cycle times and simultaneously in a material-conserving manner. In particular, by the process of the invention, surprisingly uniform pore sizes and pore size distributions are obtained throughout the foam part.

A further processible rigid foam is PVC foam. This rigid foam is universally known from fibre composite technology and sandwich production for wagon construction and the production of wind turbines and from boatbuilding. The finished foam sheets can be processed analogously to the PMI foam sheets.

The same applies to rigid PP foams. PP foams are especially known as insulation material, in transport containers and as sandwich material. PP foams can comprise fillers and are available commercially, mostly in a density range from 20 to 200 kg/m³.

Features of rigid PU foams, in comparison with flexible PU foams, are in turn a more closed pore structure and a higher degree of crosslinking. Rigid PU foams can also comprise relatively large amounts of inorganic filler materials.

The density of the rigid foam material can be selected relatively freely. Foams may be used, for example, in a density range from 25 to 220 kg/m³.

In principle, the workpieces of the invention made from a rigid foam are very widely usable.

The invention claimed is:

1. A process for producing a foam, comprising:
preheating a polymer composition to be foamed, and
foaming the polymer composition containing a blowing agent in an apparatus having a thermal heating device for heating to an internal temperature of the apparatus Ts and irradiating simultaneously the polymer composition by at least one microwave source of the apparatus:
wherein the polymer composition, prior to the foaming, is preheated to a preheating temperature $T_V$ above a glass transition temperature $T_g$ of the polymer composition.

2. The process according to claim 1, wherein the polymer composition is preheated in the apparatus at a temperature between a minimum of 80° C. below and a maximum of 10° C. above the internal temperature of the apparatus $T_S$.

3. The process according to claim 1, wherein a temperature differential between a coldest point and a hottest point within the polymer composition after the preheating is not greater than 15° C.

4. The process according to claim 1, wherein the preheated polymer composition is supplied directly to the foaming process in the apparatus.

5. The process according to claim 1, wherein the polymer composition is a material that forms a rigid foam after the foaming.

6. The process according to claim 1, wherein a preheating temperature Tv is between 110 and 190° C., and a preheating time is at least 85 min.

7. The process according to claim 1, wherein microwave radiation from the at least one microwave source has a frequency between 0.85 and 6.0 GHz.

8. The process according to claim 1, wherein the polymer composition comprises PMI (polymethacrylimide), wherein a preheating temperature $T_V$ is between 120 and 190° C., and wherein an internal temperature of the apparatus $T_S$ is between 180 and 240° C.

9. The process according to claim 1, wherein the polymer composition comprises PMMA or methacrylate-based copolymer, werein a preheating temperature $T_V$ is between 110 and 140° C., and wherein an internal temperature of the apparatus $T_S$ is between 120 and 190° C.

10. The process according to claim 5, wherein the rigid foam is selected from the group selecting of P(M)I (poly(meth)acrylimide), PMMA, a methactylate-based copolymer, polyvinyl chloride (PVC), polypropylene (PP), polyurethane (PU), a polysulfone, and a poly(ether)imide.

11. The process according to claim 6, wherein the preheating time is at least 110 min.

12. The process according to claim 1, wherein a preheating time is at least 70 min.

13. The process according to claim 1, wherein a preheating time is at least 80 min.

* * * * *